United States Patent [19]

Davis et al.

[11] Patent Number: 5,102,701

[45] Date of Patent: Apr. 7, 1992

[54] PROCESS FOR IMPARTING FLAME RETARDANCY TO POLYPROPYLENE UPHOLSTERY FABRICS

[75] Inventors: Gayron N. Davis, Opelika; Henry W. Haynes, Sr., Valley, both of Ala.

[73] Assignee: West Point Peperell, West Point, Ga.

[21] Appl. No.: 513,440

[22] Filed: Apr. 23, 1990

[51] Int. Cl.$^5$ ..................... B05D 3/02; C09K 21/00
[52] U.S. Cl. ................... 427/393.3; 427/373; 252/608
[58] Field of Search ............... 427/393.3, 373; 252/608

[56] References Cited

U.S. PATENT DOCUMENTS

| | | | |
|---|---|---|---|
| 3,699,041 | 10/1972 | Sanderford et al. | 252/608 |
| 3,778,337 | 12/1973 | Mard et al. | 427/393.3 |
| 3,816,367 | 6/1974 | Larkin et al. | 252/611 |
| 3,978,018 | 8/1976 | Self | 106/482 |
| 4,109,039 | 8/1978 | McCoy | 427/393.3 |
| 4,118,526 | 10/1978 | Gregorian et al. | 427/393.3 |
| 4,224,374 | 9/1980 | Priest | 427/244 |
| 4,246,311 | 1/1981 | Hirst | 427/412 |
| 4,343,854 | 8/1982 | Moorman | 428/290 |
| 4,863,764 | 9/1989 | Davis et al. | 427/393.3 |

Primary Examiner—Michael Lusignan
Assistant Examiner—Diana L. Dudash
Attorney, Agent, or Firm—Schweitzer Cornman & Gross

[57] ABSTRACT

A process is disclosed for imparting fire retardancy to upholstery fabrics formed principally of polypropylene fibers and involving the use of known fire retardant compositions comprised of a mixture of bromo-chlorinated paraffin and antimony oxide. The exceptional fire retardancy of the known composition is realized without imparting to the fabric an oily surface characteristic by further incorporating into the mixture a substantial quantity of metal hydrate, such as aluminum oxide trihydrate, in the form of a fine powder. The aluminum oxide trihydrate, in addition to having some fire retardant characteristics of its own, provides an enormous surface area for adsorption of the oily composition forming the primary fire retardant material. This new composition, advantageously in the form of a foam, is applied only to the back surface of the fabric. Two major advantages are realized: First, the oily composition is isolated from the front surface of the fabric. Secondly, since most polypropylene-based upholstery fabrics require a back coating operation in any event to provide adequate seam strength, the ability to introduce the fire retardancy during the back coating operation eliminates a separate production procedure and thus reduces the cost of manufacture.

13 Claims, No Drawings

PROCESS FOR IMPARTING FLAME RETARDANCY TO POLYPROPYLENE UPHOLSTERY FABRICS

RELATED CASES

This application is closely related to and constitutes an improvement on the Gayron N. Davis et al. U.S. Pat. No. 4,863,764, granted Sept. 5, 1989 to WestPoint Pepperell, Inc.

BACKGROUND AND SUMMARY OF THE INVENTION

Polypropylene fibers have many attractive characteristics for use in a wide variety of fabrics, including upholstery fabrics. Along with its many advantages, however, polypropylene fabric, in the past, has suffered a significant disadvantage in the area of its very high heat of combustion, which has rendered very difficult the matter of meeting fire retardancy standards imposed by the National Fire Protection Association (NFPA).

The process of the before mentioned Davis et al. U.S. Pat. No. 4,863,764 represents a major advance in the ability to impart appropriate levels of fire retardancy to polypropylene fabrics without seriously degrading the characteristics of the fabric and without adding excessive cost to the manufacturing process. The disclosure of the Davis et al. U.S. Pat. No. 4,863,764 is incorporated herein by reference and made a part hereof, and reference to said patent is recommended for full details of the process described therein. In general, however, the disclosed process involves the application of a bromochlorinated paraffin/antimony oxide composition to the fibers or to the fabric in amounts of about 2-15% dry weight, relative to the polypropylene fibers. Where seam strength is a factor, the fire retardant composition is mixed with a binder, desirably an acrylic latex.

Because of the characteristics of the fire retardant composition, fabrics treated according to the process of the Davis et al. U.S. Pat. No. 4,863,764 sometimes have a characteristic oily feel, due to the fact that the bromochlorinated paraffin composition, which is applied by the process, is a basically oily composition. The oily feel of the fabric is not particularly desirable, and it can result in an increased retention of soil o the surface of the fabric.

In accordance with the present invention, polypropylene fabrics are treated with the fire retardant composition disclosed in the before mentioned Davis et al. U.S. Pat. No. 4,863,764 by means of a back coating procedure, combined with the back coating operation heretofore commonly performed for the purpose of effecting improvement in seam strength. Significant advantages are derived from the new process in that the exceptionally effective fire retardancy of the before mentioned Davis et al. patent can be imparted to the fabric while at the same time realizing important improvements in the characteristics of the processed fabric. By using the new procedure, the feel of the surface of the fabric is improved, any tendency for soil retention is reduced, and improvements are realized in the seam strength of the fabric. In addition, significant economies are derived from the fact that the fire retardant material is applied in conjunction with and as part of the customary back coating of the fabric, normally carried out only for seam strength improvement, so that separate operations are not required.

In accordance with the present invention, a fire retardant composition, prepared in general accordance with the teachings of the Davis et al. U.S. Pat. No. 4,863,764, also incorporates an effective amount of a hydrated refractory or earth metals, preferably aluminum oxide trihydrate, in the form of a fine powder. The fire retardant mixture is adsorbed on the surface of the hydrated powder and the final composition is then applied to the back surface of the upholstery fabric via a back coating operation.

For a more complete understanding of the above and other features and advantages of the invention, reference should be made to the following detailed description of a preferred embodiment.

DESCRIPTION OF A PREFERRED EMBODIMENT

In the disclosure of the Davis et al. U.S. Pat. No. 4,863,764, an exceptionally effective fire retardant coating is disclosed, which is applied to polypropylene fabrics in a pad bath, to provide for a wet pick up in the range of 70-100% and dried. It is proposed in accordance with the present invention to utilize a substantially similar flame retardant composition, but with modifications to the composition enabling it to be applied via a back coating procedure, wherein the flame retardant composition is applied to and substantially retained on the back surface of the fabric, where it is capable of imparting its fire retardancy in full measure, yet has little or no deleterious effect upon the look and feel of the front surface of the fabric. A fabric processed according to the invention thus is particularly desirable for utilization as upholstery fabric, for example, or in other structural uses, where the back surface of the fabric is generally not exposed.

The fire retardant composition according to the before mentioned Davis et al. patent includes an emulsified premix, which contains a bromochlorinated paraffin with anionic and non-ionic emulsifiers. This premix is mixed together with antimony pentoxide and a binder, preferably an acrylic latex. The bromochlorinated paraffin includes at least 20% and up to 80% bromine, and preferably approximately 30% bromine and approximately 30% chlorine. Sufficient antimony pentoxide (alternatively antimony trioxide) is utilized to provide a ratio of about 0.1 to 0.5 mole of antimony to 1 mole of bromine.

In accordance with the present invention, an effective amount of flame retardant filler is employed in the mixture, and to particular advantage the filler employed is a refractory or earth metal hydrate, in the form of a fine powder. A preferred such filler is aluminum oxide trihydrate, which has both flame retarding and smoke suppressing properties, in addition to being an economical resin extender. Pursuant to the invention, the fire retardant composition is applied as a relatively viscous, foam coating to the back surface of the fabric, and dried substantially immediately thereafter to avoid wicking through to the front face of the fabric.

An advantageous coating mix utilizing the principles of the invention can consist of the following components (on a weight basis), totalling 100% of the mix:

| | |
|---|---|
| Water | 15% |
| An emulsion premix comprising 300 parts | 15% |

-continued

| | |
|---|---|
| bromochlorinated paraffin (30% bromine, 30% chlorine), in 40 parts water, 20 parts ethylene oxide non-ionic surfactant emulsifier, 10 parts phosphated alcohol anionic surfactant emulsifier | |
| Anionic colloidal dispersion of antimony pentoxide in water | 1.4% |
| Acrylic latex binder | 40% |
| Alumina trihydrate | 23% |
| Hydroxyethyl cellulose | 0.3% |
| Ammonia (28% aqueous) | 0.3% |
| Ammonium sterate (30%) | 5% |

To advantage, the antimony pentoxide dispersion can be a commercial product marketed by Nyacol Products Inc., Ashland, Mass. under the trade name Nyacol 1550.

The acrylic latex binder preferably is an ethylacrylate type acrylic with a glass transition temperature (Tg) of about 33° C., such as Polycryl 7F-7, manufactured by Morton-Thiokol Inc., Greenville, S.C. If a softer modulus is desired or required, Rhoplex TR-934, with a glass transition temperature of about −30° C., available from Rohm and Haas, is suitable. The nominal proportion of the acrylic latex binder may be varied within a relatively wide range, for example, from about 20% to about 60%.

The aluminum oxide trihydrate (ATH) advantageously is a 400 series ATH as made available by Solem Industries Inc., and preferably Solem's ATH grade SB-432. This is a very fine white powder, over 99% of which can pass through a 325 mesh screen. The nominal portion of 23% alumina trihydrate can be varied within relatively wide limits; typically, between about 12% and about 35% by weight is an effective amount in the process of the invention Similar hydrated metals may be used instead of the preferred aluminum oxide trihydrate. Examples of such are calcium carbonate hexahydrate, magnesium carbonate trihydrate, and magnesium chloride hexahydrate.

Hydroxyethyl cellulose is utilized in small quantities, as needed to provide a sufficiently viscous mixture to avoid wicking through the fabric material to which the coating is applied.

Ammonium sterate is utilized as necessary to achieve a desired degree of foaming. Desirably, the mixture is foamed to about three times its liquid volume.

In the premix emulsion (referred to as Part A in the before mentioned U.S. Pat. No. 4,863,764) the bromochlorinated paraffin advantageously is a product marketed by The Pearsall Chemical Division, Witco Corporation, Houston, Texas, under the trade name Pearsall ID-4338-A. The phosphated alcohol emulsifier advantageously is Griffwet PA-8, as made available by Grifftex Chemical, Opelika, Ala. The ethylene oxide emulsifier advantageously is Triton X-155, as made available by Rohm and Haas, Philadelphia, Pa.

In the practice of the invention, a mixture as above described is prepared and foamed, and then applied to the back surface of a moving fabric web by way of a floating knife or other suitable foam applicator. Typically and desirably, the coating is applied in sufficient quantity to have a dried coating weight equal to about 30% of the weight of the fabric. Reasonable variation from such weight is possible within the contemplation of the invention, and weights of from about 10% to about 40% are effective. Coating weights as low as 10% of the fabric weight are adequate for passing some of the less stringent flammability tests. On the other hand, the use of amounts above 40% of the weight of the fabric tends to be wasteful of the chemicals without proportionate increase in flame retardancy, and also undesirably decreases the drape of the fabric.

In a typical process, the foam composition is dried immediately after application. Drying at about 120° C. for about 60 seconds is usually adequate. The fabric desirably is carried on a tenter frame during drying, in order to preserve its width.

Aluminum oxide trihydrate is, of course, a known fire retardant, in that it begins to decompose and liberate water vapor at about 230° C. However, by itself, it is altogether inadequate for meeting many flame retardancy tests. Surprising and uniquely advantageous results are achieved by combining the metal hydrate with the bromochlorinated paraffin/antimony oxide composition of the Davis et al. U.S. Pat. No. 4,863,764. Not only is the exceptionally effective fire retardancy of the patented composition realized in full, but is actually enhanced by the action of the alumina trihydrate in its liberation of water vapor under high temperature conditions. Of particular importance, the aluminum oxide trihydrate powder particles provide a huge aggregate surface area for the adsorption of the oily bromochlorinated paraffin such that, between the aluminum oxide trihydrate particles and the acrylic latex binder, the bromochlorinated paraffin is effectively retained at the back surface of the fabric, leaving the exposed front surface clean and free of the fire retardant material.

The aluminum oxide trihydrate, which is present in significant percentage in the overall composition, is a white powder material, and imparts to the coated fabric an opaque color. Of course, if the back coating is able to work through the front surface, the color of the coating material may be evident. For this purpose, the amount of viscosity thickener (hydroxyethyl cellulose) can be adjusted as necessary, along with the ammonium sterate, in order to provide a stable foam chemical on the back of the fabric, which will remain on the back surface of the fabric until dried. If the fabric is of a relatively open weave construction, some of the white color could be evident, even though the coating is entirely retained on the back surface of the fabric. In such cases, the composition may have an appropriate color added thereto.

Following the procedures of the present invention, multiple advantages are realized. For one, the final product is superior and more desirable to products of similar fire retardancy produced in accordance with known procedures. Further, the cost of production is reduced by performing back coating and fire retardant application, previously requiring two separate process operations, in a single process step.

The final product is improved significantly by having a better feel and a better appearance by confining the relatively oily bromochlorinated paraffin mixture substantially exclusively on the back surface of the fabric. An additional and important advantage derived from that is that the front surface of the fabric is less subject to soil retention than if conventionally coated with the fire retardant composition.

In accordance with past practice, the fire retardant composition has been applied by dip coating, advantageously in a pad. In addition, the fabric conventionally has been provided with a back surface coating, in order to improve the seam strength of the relatively low friction polypropylene material. The practice of the present invention enables the fire retardancy to be imparted during a back coating operation which also imparts the desired seam strengthening characteristics, so that only a single process operation is required, with significant product savings.

It should be understood, of course, that the specific practice of the invention herein described is intended to be illustrative only. Accordingly, reference should be made to the following appended claims in determining the full scope of the invention.

We claim:

1. In the method of processing polypropylene fabrics for fire retardancy by applying to the fabric a mixture of a bromochlorinated paraffin and antimony oxide with an acrylic latex binder, the synergistic improvement characterized by
    (a) incorporating in said mixture an effective amount of a metal hydrate in the form of a fine powder effective to adsorb said bromochlorinated paraffin,
    (b) foaming the mixture to a consistency to substantially avoid significant wicking through to the front face of the fabric during subsequent drying of the mixture,
    (c) applying the mixture to the fabric exclusively by coating the foamed mixture upon the back surface of the fabric, and
    (d) immediately thereafter drying the mixture.

2. A method according to claim 1, further characterized by
    (a) said metal hydrate being selected from the group consisting of aluminum oxide trihydrate, calcium carbonate hexahydrate, magnesium carbonate trihydrate and magnesium chloride hexahydrate.

3. In the method of processing polypropylene fabrics for fire retardancy by applying to the fabric a fire retardant composition, the synergistic improvement which comprises
    (a) preparing a mixture of a bromochlorinated paraffin and at least about 12% wt. based on the composition of a metal hydrate in the form of a fine powder for absorbing the oiliness of said bromochlorinated paraffin,
    (b) incorporating said mixture (a) in from about 20% wt. to about 40% wt. based on the composition of an acrylic latex binder for retaining the other components of said mixture on the fabric,
    (c) foaming the mixture to a consistency to substantially avoid significant wicking through to the front face of the fabric during subsequent drying of the mixture,
    (d) applying the mixture to the fabric exclusively by coating the foamed mixture exclusively upon the back surface of the fabric, and
    (e) immediately thereafter drying the mixture.

4. A method according to claim 3, further characterized by
    (a) said metal hydrate being aluminum oxide trihydrate, and
    (b) an effective amount of said metal hydrate being from about 12% to about 35% by weight of the mixture.

5. A method according to claim 3, further characterized by
    (a) said mixture being foamed to a volume of about three times liquid volume, and
    (b) said mixture including a viscosity thickener.

6. A method according to claim 3, further characterized by
    (a) said mixture being applied to said fabric in an amount from about 10% to about 40% dry weight of the coating to the weight of the fabric.

7. A method according to claim 3, further characterized by
    (a) said alumina trihydrate powder consisting predominantly of particles capable of passing through a 325 mesh screen.

8. A method according to claim 3, further characterized by
    (a) said mixture being dried at a temperature of about 120° C. for about 60 seconds.

9. A method according to claim 3, further characterized by
    (a) said bromochlorinated paraffin including at least 20% wt. and up to 80% wt. bromine, and
    (b) the ratio of bromine to antimony in the mixture is approximately 0.1 to 0.5 mole of antimony per mole of bromine.

10. A method according to claim 9, further characterized by
    said bromochlorinated paraffin including approximately 30% wt. bromine and approximately 30% wt. chlorine.

11. A method according to claim 3, further characterized by
    (a) said binder being an ethylacrylate type acrylic binder.

12. In the method of processing polypropylene fabrics for fire retardancy by applying to the fabric a mixture of a bromochlorinated paraffin and antimony oxide with asn acrylic latex binder, the synergistic improvement characterized by
    (a) incorporating in said mixture an amount of a nonflammable fine powder, having a large surface area to mass ratio, effective to retain the oily bromochlorinated paraffin in an adsorbed state such that the powder, together with the acrylic latex binder, effectively retains the bromochlorinated paraffin at the back surface of the fabric,
    (b) foaming the mixture to a viscous consistency to substantially avoid significant wicking through to the front face of the fabric during the subsequent drying of the mixture,
    (c) applying the mixture to the fabric exclusively by coating the foamed mixture upon the back surface of the fabric, and
    (d) immediately thereafter drying the mixture.

13. A method according to claim 12, further characterized by
    (a) said powder being a metal oxide hydrate selected from the group consisting of aluminum oxide trihydrate, calcium carbonate hexahydrate, magnesium carbonate trihydrate and magnesium chloride hexahydrate.

* * * * *